United States Patent
Zekriardehani et al.

(10) Patent No.: US 12,024,668 B2
(45) Date of Patent: Jul. 2, 2024

(54) THERMALLY CONDUCTIVE POLYMERS

(71) Applicant: Eaton Intelligent Power Limited, Dublin (IE)

(72) Inventors: Shahab Zekriardehani, Farmington Hills, MI (US); Javed Mapkar, Farmington Hills, MI (US); Chinmaya Dandekar, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 100 days.

(21) Appl. No.: 16/893,677

(22) Filed: Jun. 5, 2020

(65) Prior Publication Data

US 2020/0385624 A1 Dec. 10, 2020

Related U.S. Application Data

(60) Provisional application No. 62/858,711, filed on Jun. 7, 2019.

(51) Int. Cl.
| | | |
|---|---|---|
| *C09K 5/14* | (2006.01) | |
| *C08L 81/02* | (2006.01) | |
| *C08L 81/04* | (2006.01) | |
| *H01B 1/24* | (2006.01) | |

(52) U.S. Cl.
CPC ............. *C09K 5/14* (2013.01); *C08L 81/02* (2013.01); *C08L 81/04* (2013.01); *H01B 1/24* (2013.01)

(58) Field of Classification Search
CPC .... C09K 5/14; H01B 1/20; H01B 1/24; C08L 77/00; C08L 77/02; C08L 77/04; C08L 81/00; C08L 81/02; C08L 81/04
See application file for complete search history.

(56) References Cited

U.S. PATENT DOCUMENTS

| | | | | | |
|---|---|---|---|---|---|
| 4,985,175 | A | * | 1/1991 | Dziurla | H01B 1/24 252/506 |
| 5,087,666 | A | * | 2/1992 | Yu | C08L 81/02 525/189 |
| 7,514,021 | B2 | * | 4/2009 | Miyagawa | H01B 1/24 252/500 |
| 7,790,841 | B1 | * | 9/2010 | Yandek | B82Y 30/00 528/480 |
| 10,233,327 | B2 | * | 3/2019 | Tomoda | C08L 81/04 |
| 10,280,304 | B2 | * | 5/2019 | Tomoda | C08L 81/02 |
| 10,287,473 | B2 | * | 5/2019 | Esseghir | C09K 5/14 |
| 2006/0135655 | A1 | | 6/2006 | Miller | |
| 2011/0040007 | A1 | * | 2/2011 | Chandrasekhar | H01B 1/22 524/404 |
| 2016/0090469 | A1 | * | 3/2016 | Mapkar | C08L 77/02 428/36.4 |
| 2016/0145411 | A1 | | 5/2016 | Uibel et al. | |
| 2017/0101530 | A1 | | 4/2017 | Zheng et al. | |
| 2018/0223054 | A1 | * | 8/2018 | Okunaka | C08L 77/06 |
| 2020/0243414 | A1 | * | 7/2020 | Kudoh | H05K 7/20481 |

FOREIGN PATENT DOCUMENTS

| | | | |
|---|---|---|---|
| CN | 102286207 A | 12/2011 | |
| CN | 104861298 A | 5/2015 | |
| CN | 105778491 A | 7/2016 | |
| EP | 3 363 864 A1 | 8/2018 | |
| JP | 04016317 A * | 1/1992 | ......... B29C 45/0025 |
| JP | 2013-221124 A | 10/2013 | |
| JP | 2013221124 A * | 10/2013 | |
| KR | 100885653 B1 | 2/2009 | |
| WO | 2014/186460 A1 | 11/2014 | |
| WO | WO-2014186460 A1 * | 11/2014 | ............... C08K 7/16 |
| WO | 2016106410 A1 | 6/2016 | |
| WO | WO-2017065009 A1 * | 4/2017 | ............... C08K 7/06 |
| WO | WO-2017179318 A1 * | 10/2017 | ......... H05K 7/20481 |

OTHER PUBLICATIONS

English language machine translation of JP 04016317 A (Year: 1992).*
English language machine translation of JP 2013221124 A (Year: 2013).*
King et al. ("Shielding effectiveness of carbon-filled polypropylene composites," Journal of Composite Materials, vol. 50(16), 2016, 2177-2189) (Year: 2015).*
Toray T300 Technical Data Sheet (Year: 2018).*
International Search Report and Written Opinion for Application No. PCT/EP2020/025264 dated Sep. 30, 2020, 11 pages.

* cited by examiner

*Primary Examiner* — Matthew R Diaz
(74) *Attorney, Agent, or Firm* — Stinson LLP

(57) ABSTRACT

Described herein are thermally conductive thermoplastic polymers comprising a polymer matrix, at least one thermally conductive filler, at least one tensile strength filler, and at least one impact strength filler.

15 Claims, No Drawings

THERMALLY CONDUCTIVE POLYMERS

CROSS-REFERENCE TO RELATED APPLICATIONS

This application claims the benefit of U.S. Provisional Application No. 62/858,711, filed Jun. 7, 2019, the entire contents of which are incorporated herein by reference.

FIELD

The present disclosure relates to thermally conductive polymers comprising one or more fillers.

BACKGROUND

Polymers are insulative materials in nature with a thermal conductivity of less than 0.3 W/m*K. One approach to increase the thermal conductivity is the inclusion of conductive fillers including carbon fiber, graphite, boron nitride, alumina, gold, copper, and graphene into the polymer matrix which, in some cases, can result in an increase of thermal conductivity up to 55 W/m*K. Usually a high concentration of conductive fillers is required in order to significantly increase the base thermal conductivity of a polymer.

There are two main concerns regarding the application of conductive fillers. First, in most cases, fillers with high thermal conductivity are expensive and it is costly to use them at high loading levels. Second, the presence of these fillers at high concentrations can cause a severe impact on the mechanical properties of the composite (i.e., impact strength, tensile strength, etc.).

A thermoplastic polymer must also be able to withstand a variety of conditions, especially when utilized in outdoor products. Outdoor electrical products can be in service for 30 or more years and are consistently exposed to extremely harsh environments, such as temperatures ranging from −35° C. to 150° C., with constant exposure to ultraviolet radiation, rain, salt, fog, ozone, thermal cycling, corrosive chemicals, and the like. The present disclosure seeks to address these and other problems.

SUMMARY

The present disclosure relates to a thermally conductive polymer comprising a polymer matrix; at least one thermally conductive filler; at least one impact strength filler; and at least one tensile strength filler; wherein: the thermally conductive filler comprises boron nitride, carbon fiber, graphite, carbon nanotubes, or mixtures thereof; the impact strength filler comprises carbon fiber, carbon nanotubes, spherical nano-particles, or mixtures thereof; and the tensile strength filler comprises carbon fiber.

Other objects and features will be in part apparent and in part pointed out hereinafter.

DETAILED DESCRIPTION

In order to address the problems of the high cost of high thermally conductive fillers and reduced mechanical properties of the composite, the present disclosure creates a conductive network made by incorporating different types of fillers into a polymer matrix in order to increase the thermal conductivity as well as the mechanical performance of the composite material. In this way, the mechanical performance of the polymer can be maintained without experiencing mechanical degradation as typically occurs when thermally conductive fillers are introduced. Different combinations of filler types can form the conductive network. Nonetheless, in some cases it is desirable to combine a 2-dimensional (2-D) filler and a 1-dimensional (1-D) filler to provide the highest thermal conductivity at lower filler loadings. In order to further improve the thermal conductivity and mechanical performance, nano-fillers can be used to enable formation of conductive networks at lower loadings. Nano-fillers can be provided in different shapes (e.g., spherical, platelet, and rod shape). Thus, the present disclosure generally uses certain nano-fillers, macro-fillers, and fibers in conjunction with a polymer or polymer blend (i.e., polymer matrix) to allow the thermally conductive material to survive in a variety of environments, including harsh and hazardous environments and outdoor, while reducing cost and maintaining desirable mechanical properties.

In one aspect, the present disclosure is directed to a thermally conductive polymer generally comprising a polymer matrix comprising a polymer or polymer blend, one or more fillers to improve thermal conductivity (thermally conductive filler), one or more fillers to improve tensile strength (tensile strength filler), and one or more fillers to improve impact strength (impact strength filler). Additional fillers can also be incorporated, such as electrically conductive fillers. The thermally conductive filler(s), tensile strength filler(s), and impact strength filler(s) can be the same or different, but in at least one embodiment there are at least two unique fillers in the thermally conductive polymers of the present disclosure. For example, one filler may satisfy both the thermally conductive filler and tensile strength filler requirements and a second filler may satisfy the impact strength filler requirement. However, it will be generally understood that any combination of fillers discussed herein will be suitable.

In one embodiment, the thermally conductive polymer of the present disclosure has a thermal conductivity of at least about 0.5 W/m*K for example from about 0.5 W/m*K to about 20 W/m*K. For example, in-plane thermal conductivity can be from about 0.5 W/m*K to about 20 W/m*K and through-plane thermal conductivity can be from about 0.5 W/m*K to about 3 W/m*K. Further, the thermally conductive polymer has an impact strength of at least about 7 kJ/m$^2$ for example from about 5 kJ/m$^2$ to about 30 kJ/m$^2$. The thermally conductive polymer also has a tensile strength of at least about 40 MPa, for example from about 40 MPa to about 90 MPa. In various embodiments, the thermally conductive polymer has a volume resistivity of at most about 10 Ω*cm for example from about 1 Ω*cm to about 10 Ω*cm.

The polymer matrix has a high resistance to chemicals and is able to withstand harsh and hazardous environments. In order to achieve ideal properties, a polymer blend may be preferred. Polymer choice can affect a variety of factors of the resulting thermoplastic, such as tensile strength, impact strength, chemical resistance, operating temperature, heat distortion temperature, and the like. Thus, blending different polymers with different desirable characteristics can provide a polymer matrix with a combination of those characteristics.

The polymer matrix can comprise a resin material. The polymer/resin can comprise a thermoplastic material or a thermoset material. In particular, useful polymers include thermoplastic polymers, for example, acrylonitrile butadiene styrene, acrylic, celluloid, cellulose acetate, cyclic olefin copolymer, ethylene-vinyl acetate, ethylene vinyl alcohol, polytetrafluoro ethylene, ionomers, liquid crystal polymer, polyoxymethylene, polyacrylates, polyacrylonitrile, polyamide (e.g., polyamide 66 or polyamide 6), polyamide-imide, polyimide, polyaryletherketone, polybutadiene, polybutylene terephthalate, polycarpolactone, polychlorotrifluoroetyhlene, polyether ether ketone, polyethylene terephthalate, poly-cylcohexylene dimethylene terephthalate, polycarbonate, polyhydroxalkanoates, polyketones, polyester, polyolefin (e.g., polyethylene, polypropylene, polybutylene, and the like) polyetherketoneketone, polyetherimide, polyethersulfone, polysulfone, chlorinated polyethylene, polylactic acid, polymethylmetacrylate, polymethylpentene, polyphenylene, polyphenylene sulfide (PPS), polyphthalamide, polystyrene, polysulfone, polytrimethylene terephthalate, polyurethane, polyvinyl acetate, polyvinyl chloride, polyvinylidene chloride, styrene-acrylonitrile, or mixtures thereof.

In various embodiments, the base polymer comprises polyphenylene sulfide (PPS) blended with one or more additional polymers. Because PPS is known to create, in some circumstances, a brittle composite, a second polymer can be blended with PPS in order to improve impact properties. For example, PPS can be blended with an elastomer or a polyolefin (such as, for example, polyethylene and/or polypropylene) at relatively low concentrations. Alternatively, in other embodiments, the base polymer comprises a polyketone blended with one or more additional polymers. As an example, and in general, the additional polymer(s) (for example, polyethylene and/or polypropylene) can be incorporated into the base polymer (for example, PPS or polyketone) at a total concentration of less than about 50 wt. %, less than about 40 wt. %, less than about 30 wt. %, less than about 20 wt. %, less than about 15 wt. %, less than about 10 wt. %, or less than about 5 wt. %. Thus, in these embodiments, the base polymer (for example, PPS or polyketone), is present in the polymer matrix at a concentration of at least about 50 wt. %, at least about 60 wt. %, at least about 70 wt. %, at least about 80 wt. %, at least about 85 wt. %, at least about 90 wt. %, or at least about 95 wt. %. The additional polymer(s) (for example, polyethylene and/or polypropylene) can be incorporated into the base polymer (for example, PPS or polyketone) at a total concentration of from about 5 wt. % to about 50 wt. %, from about 5 wt. % to about 40 wt. %, from about 5 wt. % to about 30 wt. %, from about 10 wt. % to about 30 wt. %, from about 10 wt. % to about 20 wt. %, from about 10 wt. % to about 15 wt. %, or from about 15 wt. % to about 20 wt. %. In these embodiments, the base polymer (for example, PPS or polyketone) is present at a concentration of from about 50 wt. % to about 95 wt. %, from about 50 wt. % to about 90 wt. %, from about 70 wt. % to about 95 wt. %, from about 70 wt. % to about 90 wt. %, from about 80 wt. % to about 90 wt. %, from about 85 wt. % to about 90 wt. %, or from about 80 wt. % to about 85 wt. %.

In general, the total filler weight (i.e., combined weight of thermally conductive filler, tensile strength filler, and impact strength filler) added to the polymer or combination of polymers is less than about 55 wt. %, less than about 50 wt. %, less than about 45 wt. %, less than about 40 wt. %, less than about 35 wt. %, less than about 30 wt. %, less than about 25 wt. %, less than about 20 wt. %, less than about 15 wt. %, less than about 10 wt. %, or less than about 5 wt. %. For example, the total filler weight can be from about 5 wt. % to about 55 wt. %, from about 10 wt. % to about 50 wt. %, from about 10 wt. % to about 45 wt. %, from about 10 wt. % to about 40 wt. %, from about 15 wt. % to about 40 wt. %, from about 20 wt. % to about 40 wt. %, from about 25 wt. % to about 40 wt. %, from about 30 wt. % to about 40 wt. %, or from about 35 wt. % to about 40 wt. %.

The thermally conductive filler can comprise any filler with thermal conductivity known in the art. The filler can have high thermal conductivity (for example, having a thermal conductivity of up to about 900 W/m*K or greater than about 10 W/m*K), an intermediate thermal conductivity (for example, having a thermal conductivity of from about 5 W/m*K to about 10 W/m*K), or a low thermal conductivity (less than about 5 W/m*K). Generally, high thermal conductivity and intermediate thermal conductivity fillers are preferred when used primarily as the thermally conductive filler. When used as the sole thermally conductive filler, high thermal conductivity fillers are most preferred, although intermediate thermal conductivity fillers could also be utilized.

As an example, the thermally conductive filler can comprise carbon black, alumina, boron nitride, silica, carbon fiber, graphene, graphene oxide, graphite (such as, for example, expanded graphite, synthesized graphite, low-temperature expanded graphite, and the like), aluminum nitride, silicon nitride, metal oxide (such as, for example, zinc oxide, magnesium oxide, beryllium oxide, titanium oxide, zirconium oxide, yttrium oxide, and the like), carbon nanotubes, calcium carbonate, talc, mica, wollastonite, clays (including exfoliated clays), metal powders (such as, for example, aluminum, copper, bronze, brass, and the like), or mixtures thereof. For example, the thermally conductive filler can comprise boron nitride, carbon fiber, graphite, carbon nanotubes, or mixtures thereof. In certain embodiments, the thermally conductive filler comprises chopped carbon fibers.

The chopped carbon fibers used as thermally conductive fillers can have an aspect ratio of at least 50 to 500.

In general, the thermally conductive filler can comprise from about 2 wt. % to about 40 wt. %, for example, from about 2 wt. % to about 20 wt. %, from about 2.5 wt. % to about 20 wt. %, from about 2.5 wt. % to about 15 wt. %, from about 2.5 wt. % to about 10 wt. %, or from about 2.5 wt. % to about 5 wt. % of the composition. Preferably, the thermally conductive filler comprises from about 2.5 wt. % to about 15 wt. %, more preferably from about 2.5 wt. % to about 5 wt. % of the composition.

The tensile strength filler can comprise, for example, a macro-size filler and/or a nano-size filler. For example, the macro-size tensile strength filler can comprise carbon fibers. The nano-size tensile strength filler can comprise nano-diamonds, carbon nanotubes, or mixtures thereof. The tensile strength of the filler can be from about 30 MPa to about 100 MPa.

In general, the tensile strength filler can comprise, for example, from about 2 wt. % to about 30 wt. %, from about 5 wt. % to about 30 wt. %, from about 10 wt. % to about 30 wt. %, from about 10 wt. % to about 25 wt. %, from about 10 wt. % to about 20 wt. % or from about 10 wt. % to about 15 wt. % of the composition. Preferably, the tensile strength filler comprises from about 10 wt. % to about 30 wt. %, more preferably from about 10 wt. % to about 15 wt. % of the composition.

A mixture of nano- and micro-fillers can significantly increase the impact strength of the composite. The nano-size impact strength filler can comprise, for example, carbon nanotubes, clays (including exfoliated clays), other high-aspect ratio fibers, rods, and flakes, spherical nano-particles (including, for example, nano-diamonds, fumed silica, nano-alumina, and fumed alumina), or mixtures thereof. The micro-size impact strength filler can comprise, for example, carbon fiber (for example, chopped carbon fiber, amorphous carbon fiber, long carbon fiber, and the like), alumina, or mixtures thereof. In various embodiments, the impact strength filler comprises chopped carbon fiber, spherical nano-particles, or mixtures thereof.

In general, the impact strength filler can comprise, for example, from about 2 wt. % to about 30 wt. %, from about 5 wt. % to about 30 wt. %, from about 10 wt. % to about 30 wt. %, from about 10 wt. % to about 25 wt. %, from about 10 wt. % to about 20 wt. % or from about 10 wt. % to about 15 wt. % of the composition. Preferably, the impact strength filler comprises from about 10 wt. % to about 30 wt. %, more preferably from about 10 wt. % to about 15 wt. % of the composition.

It may also be desirable to incorporate an electrically conductive filler into the polymer matrix. Electrically conductive fillers include, but are not limited to, carbon fibers, carbon nanotubes, and mixtures thereof. In general, the electrically conductive filler can comprise from about 2 wt. % to about 30 wt. %, for example, from about 2 wt. % to about 20 wt. %, from about 2.5 wt. % to about 20 wt. %, from about 2.5 wt. % to about 15 wt. %, from about 2.5 wt. % to about 10 wt. %, or from about 2.5 wt. % to about 5 wt. % of the composition. Preferably, the electrically conductive filler comprises from about 2.5 wt. % to about 15 wt. %, more preferably from about 2.5 wt. % to about 5 wt. % of the composition.

Additional fillers can also be incorporated to promote the formation of a 3-dimensional (3-D) conductive network (such as, for example, synthesized graphite, carbon nanotubes, and the like), dispersion of fibers (such as, for example, polyhedral oligomeric silsesquioxane, and the like), processability (such as, for example, polyhedral oligomeric silsesquioxane, and the like), and provide interlayer shear (such as, for example, spherical nanoparticles, including, but not limited to, nano-diamonds, fumed silica, nano-alumina, and fumed alumina). The additional fillers can be individually incorporated at a concentration of from about 0.1 wt. % to about 10 wt. %, for example, from about 0.1 wt. % to about 7 wt. %, from about 0.1 wt. % to about 6 wt. %, from about 0.1 wt. % to about 5 wt. %, from about 0.1 wt. % to about 4 wt. %, from about 0.1 wt. % to about 3 wt. %, from about 0.1 wt. % to about 2 wt. %, from about 0.1 wt. % to about 1 wt. %, or from about 0.1 wt. % to about 0.5 wt. % of the composition.

In another embodiment, fillers can also be incorporated to promote the formation of a 3-dimensional (3-D) conductive network at a concentration of from about 10 wt. % to about 40 wt. %, for example, from about 10 wt. % to about 30 wt. %, from about 10 wt. % to about 20 wt. %, or from about 15 wt. % to about 20 wt. % of the composition.

As an example, a preferred embodiment of the disclosure includes the following fillers in a PPS and polyethylene and/or polypropylene polymer matrix:

| Filler | Application (in order of priority) | Concentration | Preferred Concentration |
|---|---|---|---|
| Chopped carbon fiber with intermediate thermal conductivity | Impact strength filler, tensile strength filler, thermally conductive filler, electrically conductive filler | 10 wt. % to 30 wt. % | 10 wt. % to 15 wt. % |
| Chopped carbon fiber with high thermal conductivity | Thermally conductive filler, impact strength filler, tensile strength filler, electrically conductive filler | 2.5 wt. % to 15 wt. % | 2.5 wt. % to 5 wt. % |
| Synthesized graphite | Thermally conductive filler, formation of 3-D conductive network | 10 wt. % to 40 wt. % | 15 wt. % to 20 wt. % |
| Polyhedral oligomeric silsesquioxane | Dispersion of fillers, processability | 0.1 wt. % to 3 wt. % | 0.1 wt. % to 1 wt. % |
| Carbon nanotubes | Formation of 3-D conductive network, thermally conductive filler, electrically conductive filler | 0.1 wt % to 5 wt. % | 0.1 wt. % to 2 wt. % |
| Spherical nano-particles | Impact strength filler, interlayer shear | 0.1 wt. % to 2 wt. % | 0.1 wt. % to 0.5 wt. % |

Additional additives can be included to provide modified characteristics, such as UV stability, fire retardancy, heat stabilizers, antioxidants, dyes, pigments, mold release agents, lubricants, adhesion promoters, and the like. The additional additives, when used, will generally be present in an amount of from about 0.1 wt. % to about 5 wt. %.

The thermoplastic polymer compositions of the present disclosure can be used in articles and methods known to those skilled in the art. For example, the compositions can be injection molded, blow molded, and/or extruded. Suitable applications include lighting fixtures, electric housings, motor housings, power converters (e.g., inverter housings or enclosures), heat sinks, cold plates, heat pipes, module enclosures (e.g., sensors), and camera housings or enclosures. Particularly useful applications include use in light-emitting diode (LED) fixtures, for example, as a heat sink. The thermoplastic polymer compositions of the present disclosure can replace articles made from aluminum or other metal. In this way, the article can be more lightweight, recyclable, lower cost, and have a faster cycle time than traditional aluminum articles.

In various embodiments, the thermoplastic polymer compositions and/or articles made from the thermoplastic polymer compositions of the present disclosure meet certain standards and/or requirements. For example, NEMA sets standards with which an enclosure must comply in order to qualify as an explosion-proof enclosure. Specifically, NEMA Type 7, Type 8, Type 9, and Type 10 enclosures set standards with which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to National Electric Code (e.g., Class 1, Division I) and Underwriters' Laboratories, Inc. (UL) (e.g., UL 1203). For example, a Class 1 hazardous area under the National Electric Code is an area in which flammable gases or vapors may be present in the air in sufficient quantities to be explosive.

Examples of hazardous locations in which example embodiments can be used include, but are not limited to, an airplane hangar, an airplane, a drilling rig (as for oil, gas, or water), a production rig (as for oil or gas), a refinery, a chemical plant, a power plant, a mining operation, a steel mill, and the like.

Having described the disclosure in detail, it will be apparent that modifications and variations are possible without departing from the scope of the disclosure defined in the appended claims.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the compositions without departing from the scope of the disclosure, it is intended that all matter contained in the above description shall be interpreted as illustrative and not in a limiting sense.

The invention claimed is:

1. A thermally conductive polymer comprising:
a polymer matrix;
at least one thermally conductive filler;
at least one impact strength filler; and
at least one tensile strength filler;
wherein:
the thermally conductive filler comprises graphite having a concentration of from about 15 wt. % to about 20 wt. %;
the impact strength filler comprises carbon nanotubes, spherical nano-particles, or mixtures thereof; and
the tensile strength filler comprises carbon fiber having a thermal conductivity of greater than about 10 W/m*K and a concentration from about 2.5 wt. % to about 5 wt. %;
wherein a thermal conductivity of the thermally conductive polymer is about 10 W/m*K to about 20 W/m*K; and
wherein the total filler weight is less than about 30 wt. %.

2. The thermally conductive polymer of claim 1 wherein the concentration of the at least one impact strength filler is from about 2 wt. % to about 12.5 wt. %.

3. The thermally conductive polymer of claim 1 wherein the polymer matrix comprises at least one polymer selected from the group consisting of polyphenylene sulfide, polyamide 66, polyamide 6, polyketone, polyolefin, and mixtures thereof.

4. The thermally conductive polymer of claim 3 wherein the polymer matrix comprises at least one of polyketone, polyphenylene sulfide, polyethylene, polypropylene, or mixtures thereof.

5. The thermally conductive polymer of claim 4 wherein the polymer matrix comprises polyphenylene sulfide at a concentration of at least about 70 wt. %, and polyethylene, polypropylene, or a mixture thereof at a concentration of less than about 30 wt. %.

6. The thermally conductive polymer of claim 1 further comprising at least one electrically conductive filler, wherein the electrically conductive filler comprises carbon fibers, carbon nanotubes, or mixtures thereof.

7. The thermally conductive polymer of claim 1 further comprising:
(a) a filler to promote dispersion of fillers comprising polyhedral oligomeric silsesquioxane;
(b) a filler to promote processability comprising polyhedral oligomeric silsesquioxane;
(c) a filler to promote formation of a 3-D network comprising synthesized graphite, carbon nanotubes, or mixtures thereof; and/or
(d) a filler to provide interlayer shear comprising spherical nano-particles.

8. The thermally conductive polymer of claim 7 wherein:
(a) the concentration of the filler to promote dispersion of fillers is from about 0.1 wt. % to about 3 wt. %;
(b) the concentration of the filler to promote processability is from about 0.1 wt. % to about 3 wt. %;
(c) the concentration of the filler to promote formation of a 3-D network is from about 0.1 wt. % to about 10 wt. %; and/or
(d) the concentration of the filler to provide interlayer shear is from about 0.1 wt. % to about 2 wt. %.

9. The thermally conductive polymer of claim 1 wherein the spherical nano-particles comprise nano-diamonds, fumed silica, nano-alumina, fumed alumina, or mixtures thereof.

10. The thermally conductive polymer of claim 1 wherein the thermally conductive filler comprises synthesized graphite.

11. The thermally conductive polymer of claim 1 wherein the impact strength filler comprises spherical nano-particles.

12. The thermally conductive polymer of claim 1 wherein the carbon fiber comprises chopped carbon fiber.

13. The thermally conductive polymer of claim 1 wherein an impact strength of the thermally conductive polymer is at least about 7 kJ/m$^2$.

14. The thermally conductive polymer of claim 1 wherein a tensile strength of the thermally conductive polymer is at least about 40 MPa.

15. The thermally conductive polymer of claim 1 wherein a volume resistivity of the thermally conductive polymer is no more than about 10 Ω*cm.

* * * * *